United States Patent
Yamada

(10) Patent No.: US 12,153,877 B2
(45) Date of Patent: Nov. 26, 2024

(54) TRAINING DATA GENERATION DEVICE, TRAINING DATA GENERATION METHOD AND TRAINING DATA GENERATION PROGRAM

(71) Applicant: Nippon Telegraph and Telephone Corporation, Tokyo (JP)

(72) Inventor: Takeshi Yamada, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 289 days.

(21) Appl. No.: 17/625,827

(22) PCT Filed: Jul. 17, 2019

(86) PCT No.: PCT/JP2019/028175
§ 371 (c)(1),
(2) Date: Jan. 10, 2022

(87) PCT Pub. No.: WO2021/009885
PCT Pub. Date: Jan. 21, 2021

(65) Prior Publication Data
US 2022/0277138 A1  Sep. 1, 2022

(51) Int. Cl.
*G06F 40/117* (2020.01)
*G06F 40/194* (2020.01)
*G06F 40/20* (2020.01)
*G06N 7/01* (2023.01)
(Continued)

(52) U.S. Cl.
CPC .......... *G06F 40/194* (2020.01); *G06F 40/117* (2020.01); *G06F 40/20* (2020.01); *G06N 7/01* (2023.01)

(58) Field of Classification Search
CPC ...... G06F 40/194; G06F 40/117; G06F 40/20; G06F 40/284; G06F 40/30; G06N 7/01; G06N 20/00
See application file for complete search history.

(56) References Cited

U.S. PATENT DOCUMENTS 9,146,915 B2 * 9/2015 He ........................... G06F 40/30
2020/0034911 A1 * 1/2020 Sriram ............... G06Q 30/0631

FOREIGN PATENT DOCUMENTS

JP  2009271795 A  * 11/2009
JP  2010128677 A  *  6/2010
JP  2018018373       2/2018

OTHER PUBLICATIONS

Sato et al. "The Automatic Test Case Creation Method by the Automatic Structuring of Specification" Institute of Electronics, Information and Communications Technology, Shingaku Giho IEICE Technical Report NS2017-158 (Jan. 2018) (Year: 2018).*

(Continued)

*Primary Examiner* — Daniel C Washburn
*Assistant Examiner* — Penny L Caudle
(74) *Attorney, Agent, or Firm* — Fish & Richardson P.C.

(57) ABSTRACT

In teacher data generation processing for generating teacher data in which a tag is imparted in a document, a calculation unit (15a) calculates a relevance degree between a description in a document and a description in a document corresponding to a tag. When the calculated relevance degree is equal to or greater than a predetermined threshold, the imparting unit (15b) imparts the tag to a portion where the description is provided in the document.

8 Claims, 7 Drawing Sheets

(51) Int. Cl.
  *G06F 40/284* (2020.01)
  *G06F 40/30* (2020.01)

(56) References Cited

OTHER PUBLICATIONS

Yamamoto et al., "Hierarchical estimation of aspects for real-life Tweets," DEIM Forum 2014 C4-1 The 6th forum on data engineering and information management (The 12th annual conference of the Database Society of Japan), Mar. 3, 2014, 17 pages (with English Translation).

* cited by examiner

TRAINING DATA GENERATION DEVICE, TRAINING DATA GENERATION METHOD AND TRAINING DATA GENERATION PROGRAM

CROSS-REFERENCE TO RELATED APPLICATIONS

This application is a National Stage application under 35 U.S.C. § 371 of International Application No. PCT/JP2019/028175, having an International Filing Date of Jul. 17, 2019. The disclosure of the prior application is considered part of the disclosure of this application, and is incorporated in its entirety into this application.

TECHNICAL FIELD

The present invention relates to a teacher data generation apparatus, a teacher data generation method, and a teacher data generation program.

BACKGROUND ART

In recent years, there has been studied a technology in which test items for development requirements are automatically extracted from a document such as a design document written by a non-engineer using a natural language (see PTL 1). The technology uses, for example, a technique of machine learning such as conditional random fields (CRF) to impart a tag to an important description portion in a design document, such as a target device, an input, an output, a state, or a checkpoint, and automatically extract a test item from a range of the imparted tag. In that case, machine learning is performed using the design document in which the tag is imparted as teacher data, so that a tag is automatically imparted to a design document.

CITATION LIST

Patent Literature

PTL 1: JP 2018-018373 A

SUMMARY OF THE INVENTION

Technical Problem

However, in the related art, a tag has been manually imparted in teacher data and thus it has taken a great deal of work to supplement teacher data.

The present invention is made in view of the foregoing, and an object thereof is to easily supplement teacher data in which a tag is appropriately imparted in a document.

Means for Solving the Problem

In order to solve the above-described problem and achieve the object, a teacher data generation apparatus according to an aspect of the present invention is a teacher data generation apparatus for generating teacher data in which a tag corresponding to a description is imparted in a document, the teacher data generation apparatus including: a calculation unit configured to calculate a relevance degree between a description in a document and a description in a document corresponding to a tag; and an imparting unit configured to impart the tag to a portion where the description is provided in the document when the relevance degree calculated is equal to or greater than a predetermined threshold.

Effects of the Invention

According to the present invention, it is possible to easily supplement teacher data in which a tag is appropriately imparted in a document.

DESCRIPTION OF EMBODIMENTS

Hereinafter, an embodiment of the present invention will be described in detail with reference to the drawings. Note that the present invention is not limited by the embodiment. Note that in description of the drawings, the same components are denoted by the same reference signs.

Processing of System

Figure 1:
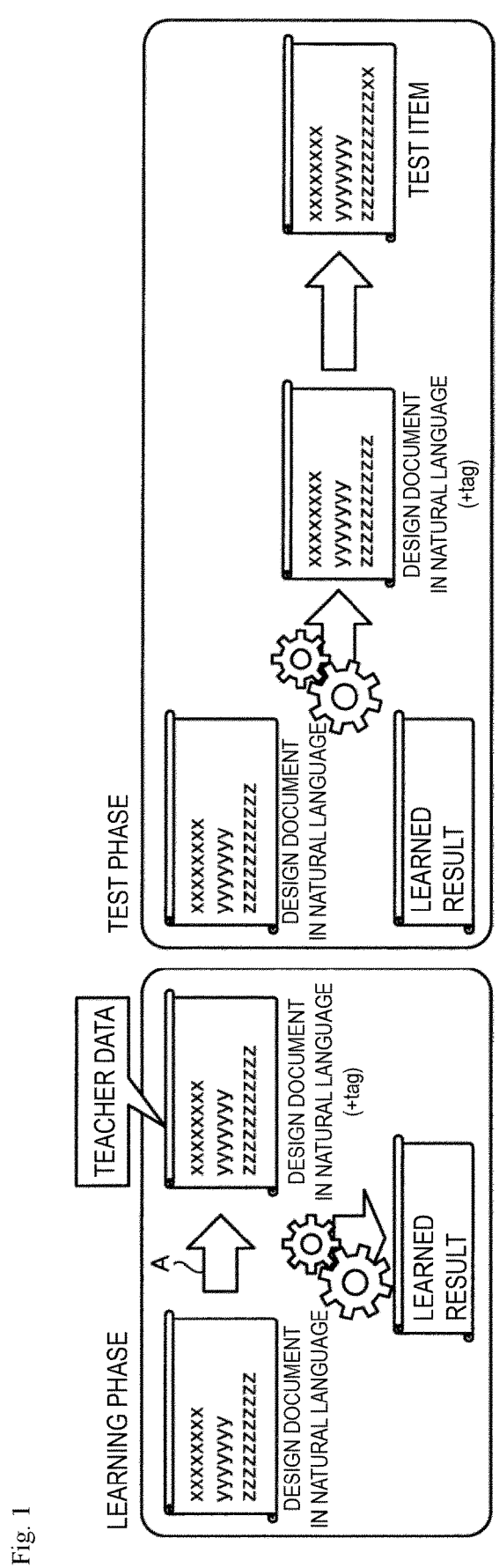
FIG. 1 is a diagram for explaining summary of processing of a system including a teacher data generation apparatus according to a present embodiment.
Figure 2:
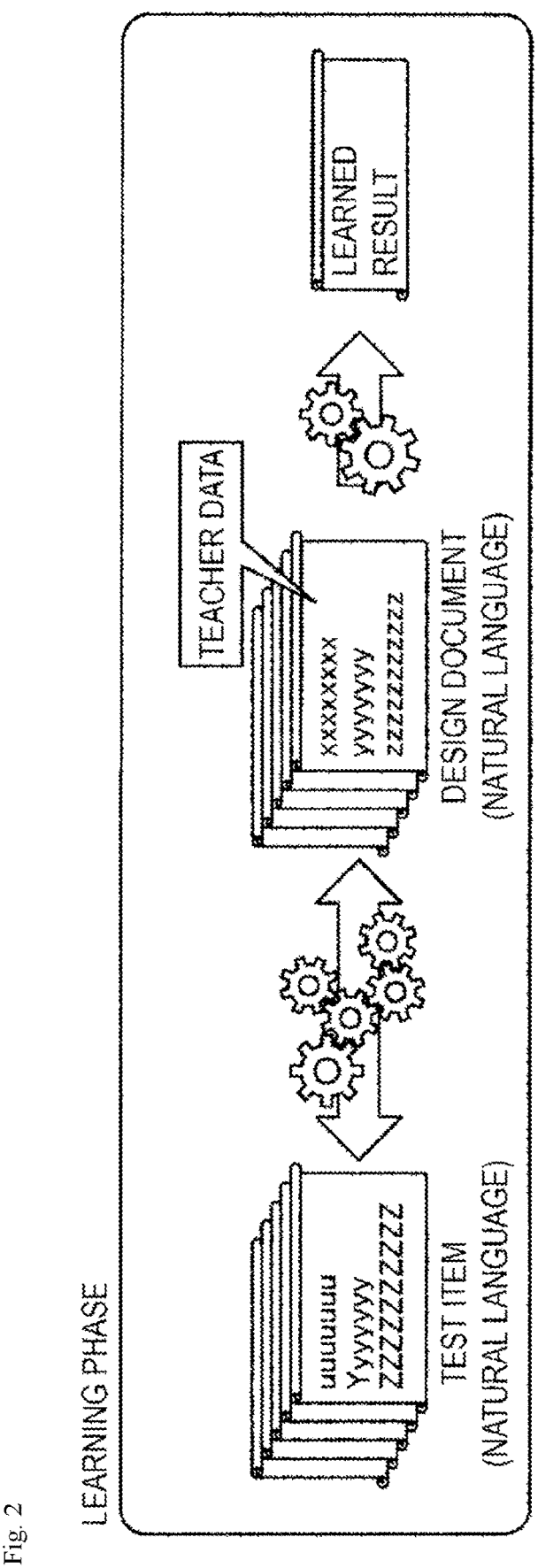
FIG. 2 is a diagram for explaining the summary of the processing of the system including the teacher data generation apparatus according to the present embodiment.

FIGS. 1 and 2 are diagrams for explaining summary of processing of a system including a teacher data generation apparatus according to the present embodiment. The system including the teacher data generation apparatus according to the present embodiment performs test item extraction processing. First, as illustrated in FIG. 1, the system imparts a tag to an important description portion in a document such as a design document written in a natural language. This important portion indicates development requirements and the like such as a target device, an input, an output, a state, and a checkpoint. The system then automatically extracts a test item from a range indicated by the tag in the document (see PTL 1).

Specifically, in a learning phase, the system performs machine learning using as teacher data the document in which the tag is imparted to an important description portion to learn a tendency of imparting the tag in the teacher data by stochastic calculation, and outputs the calculated tendency as a learned result. For example, the system learns the tendency of imparting the tag from a location and a type of the tag, words before and after the tag, a context, and the like.

In a test phase, the system uses the learned result that is obtained in the learning phase and indicates the tendency of imparting the tag in the teacher data to automatically impart a tag to a document to be subjected to the test item extraction processing of extracting a test item. The system then automatically extracts the test item from a range to which the tag has been imparted in the document.

Here, in the processing in the learning phase illustrated by A in FIG. 1, it takes a great deal of work to manually generate the teacher data. Thus, the teacher data generation apparatus according to the present embodiment automatically imparts the tag in the document to generate the teacher data. Specifically, as illustrated in FIG. 2, in the learning phase, the teacher data generation apparatus determines which portion in the design document the description of the test item corresponding to the tag to be imparted corresponds to, and automatically imparts the tag to the determined portion to generate the teacher data. That is, the teacher data generation apparatus uses a technique of pointwise mutual information (PMI) to determine, in the design document, a portion having a high relevance degree to the description of the test item, and automatically imparts the tag to the determined portion to generate the teacher data.

In this manner, the teacher data generation apparatus automatically generates the teacher data in which the tag corresponding to the description is appropriately imparted in the document, which allows the teacher data to be easily supplemented.

Configuration of Teacher Data Generation Apparatus

Figure 3:
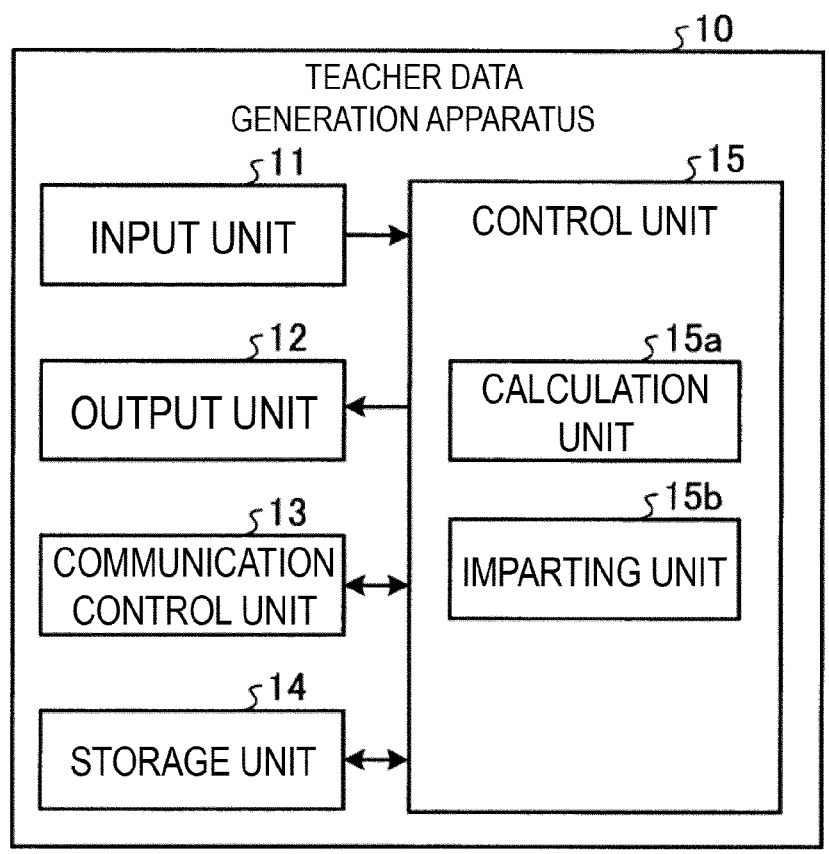
FIG. 3 is a schematic diagram illustrating a schematic configuration of the teacher data generation apparatus according to the present embodiment.

FIG. 3 is a schematic diagram illustrating a schematic configuration of the teacher data generation apparatus according to the present embodiment. As illustrated as an example in FIG. 3, the teacher data generation apparatus 10 according to the present embodiment is implemented by a general-purpose computer such as a personal computer and includes an input unit 11, an output unit 12, a communication control unit 13, a storage unit 14, and a control unit 15.

The input unit 11 is implemented using an input device such as a keyboard or a mouse and inputs various kinds of instruction information such as instruction information for starting processing to the control unit 15 in response to an operation input by an operator. The output unit 12 is implemented by a display device such as a liquid crystal display or a printing device such as a printer. For example, the output unit 12 displays a result of teacher data generation processing, which will be described later.

The communication control unit 13 is implemented by a network interface card (NIC) or the like and controls communication between the control unit 15 and an external apparatus via an electric communication line such as a local area network (LAN) or the Internet. For example, the communication control unit 13 controls communication of the control unit 15 with a management device that manages a document related to development such as a design document, a test item, and the like, an imparting device that learns the tendency of imparting a tag in a document to automatically impart a tag in a document, an extraction device that extracts a test item from a range to which a tag is imparted in a document, or the like.

The storage unit 14 is implemented by a semiconductor memory element such as a random access memory (RAM) or a flash memory or a storage device such as a hard disk or an optical disc. A processing program for causing the teacher data generation apparatus 10 to operate, data used during execution of the processing program, and the like are stored in the storage unit 14 in advance, or are temporarily stored every time processing is performed. Note that the storage unit 14 may be configured to communicate with the control unit 15 via the communication control unit 13.

The control unit 15 is implemented using a central processing unit (CPU) or the like and executes the processing program stored in the memory. Accordingly, the control unit 15 functions as a calculation unit 15a and an imparting unit 15b as illustrated as an example in FIG. 3. Note that these functional units may be installed on different pieces of hardware. Moreover, the control unit 15 may include other functional units.

The calculation unit 15a calculates a relevance degree between a description in a document and a description in a document corresponding to a tag. For example, the calculation unit 15a acquires, via the input unit 11 or the communication control unit 13, a design document in which a tag is to be imparted, and a test item corresponding to the tag to be imparted. In addition, the calculation unit 15a calculates a relevance degree between a description in the design document and a description of the test item corresponding to the tag to be imparted, using the pointwise mutual information PMI.

For example, the calculation unit 15a calculate a relevance degree of each word using a probability of occurrence of the word in the document and a probability of occurrence of the word in the document corresponding to the tag. Specifically, the calculation unit 15a calculates the PMI represented by the following Equation (1) for each word y in the design document and a prerequisite event x that the word y is present in the test item corresponding to the tag.

[Math. 1]

$$\mathrm{PMI}(x,y) = -\log P(y) - \{-\log P(y|x)\} \qquad (1)$$

where $-\log P(y)$: amount of information that the word y occurs in a sentence $-\log P(y|x)$: amount of information that a prerequisite event x and the word y co-occur As indicated in Equation (1) above, PMI(x, y) is a difference between an amount of information calculated using a probability of occurrence p(y) of the word y in the document and an amount of information calculated using a probability of occurrence p(y|x) of the word y within the range of the tag. For example, when there is one wordy included in a document consisting of 20 words, p(y) is equal to $\frac{1}{20}$. When there is no wordy within the range of the tag, p(y|x) is equal to zero. In this case, PMI(x, y)=4.3−∞=−∞ is calculated.

Here, in the case of p(y)>p(y|x), the PMI value becomes a negative value, and it is quantitatively evaluated that the relevance degree of the word y to the tag is low. Furthermore, in the case of p(y)=p(y|x), the PMI value becomes zero, and it is quantitatively evaluated that the relevance degree of the word y to the inside of the tag is equal to the relevance degree of the wordy to the outside of the tag. Furthermore, in the case of p(y)<p(y|x), the PMI value becomes a positive value, and it is quantitatively evaluated that the relevance degree of the word y to the tag is high. In other words, a larger value of the amount of information in Equation (1) above represents a higher relevance degree.

The calculation unit 15a uses the number of appearance $n_y$ of each word y in the design document and the total number of words X in the design document to calculate P(y) as indicated in the following Equation (2), for each word in the design document.

[Math. 2]

$$P(y) = \frac{n_y}{X} \qquad (2)$$

where $n_y$: number of appearance of each word y in the design document

X: number of words in the design document

In addition, the calculation unit 15a calculates, for each word in the test item corresponding to the tag, P(y|x) as indicated in the following Equation (3), using the number of appearance $n_{y|x}$ of the word y in the test item and the total number of words W in the test item.

[Math. 3]

$$P(y \mid x) = \frac{P(y \cap x)}{P(x)} = \frac{n_{y|x}}{W} \qquad (3)$$

where, $n_{y|x}$: number of appearance of the word y in the test item

W: number of words in the test item

Furthermore, the calculation unit 15a calculates an average value of relevance degrees of words constituting a sentence in the document as a relevance degree of each sentence. For example, in a case where a sentence α is composed of words A, B, C, and D and the respective PMI values of the words A, B, C, and C are 1, 2, 0.4, and −1, the calculation unit 15a calculates the average value (=0.6) of the PMI values of the respective words as the relevance degree of the sentence α.

Figure 4:
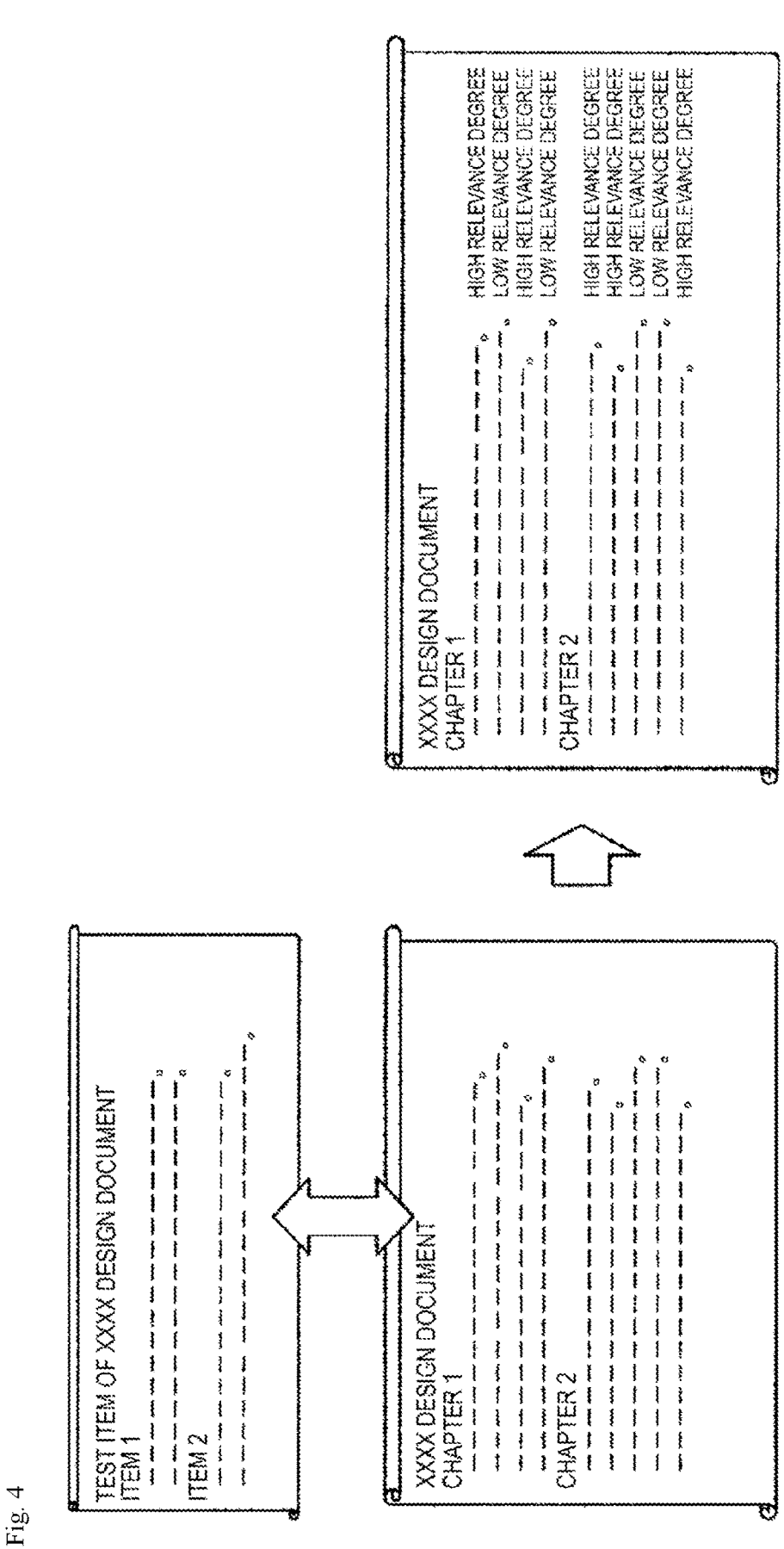
FIG. 4 is a diagram for explaining processing of a calculation unit.

In this way, the calculation unit 15a can determine, in the design document, a portion having a high relevance degree to a description of a test item corresponding to a tag to be imparted. FIG. 4 is a diagram for explaining processing of the calculation unit 15a. In an example illustrated in FIG. 4, the calculation unit 15a determines whether a relevance degree of each sentence is high or low based on a predetermined threshold. In other words, when a calculated relevance degree is equal to or greater than the predetermined threshold, the calculation unit 15a determines that the relevance degree is high. On the other hand, when a calculated relevance degree is less than the predetermined threshold, the calculation unit 15a determines that the relevance degree is low.

A description will be given with reference to FIG. 3 again. The imparting unit 15b imparts a tag to a portion where the description is provided in the document when the calculated relevance degree is equal to or greater than the predetermined threshold. Specifically, the imparting unit 15b imparts the tag corresponding to the test item to the portion where the description determined to have the relevance degree equal to or greater than the predetermined threshold is provided in the design document. For example, in an example illustrated in FIG. 4, the imparting unit 15b imparts the tag corresponding to the test item to a range of a sentence determined to have a high relevance degree to the description of the test item to generate teacher data.

In this manner, the imparting unit 15b imparts the tag corresponding to the test item in the design document to generate the teacher data and outputs the generated teacher data. For example, the imparting unit 15b outputs the teacher data to an imparting device configured to automatically impart a tag in a document, via the output unit 12 or the communication control unit 13.

The imparting device uses the teacher data to learn the tendency of imparting the tag in the document, uses the learned result to automatically impart a tag in a document, and outputs the document in which the tag has been imparted to an extraction device that extracts a test item. The extraction device uses the document in which the tag has been imparted to automatically extract the test item for a range indicated by the tag, using statistical information on the test of the same or similar portion.

Teacher Data Generation Processing

Figure 5:
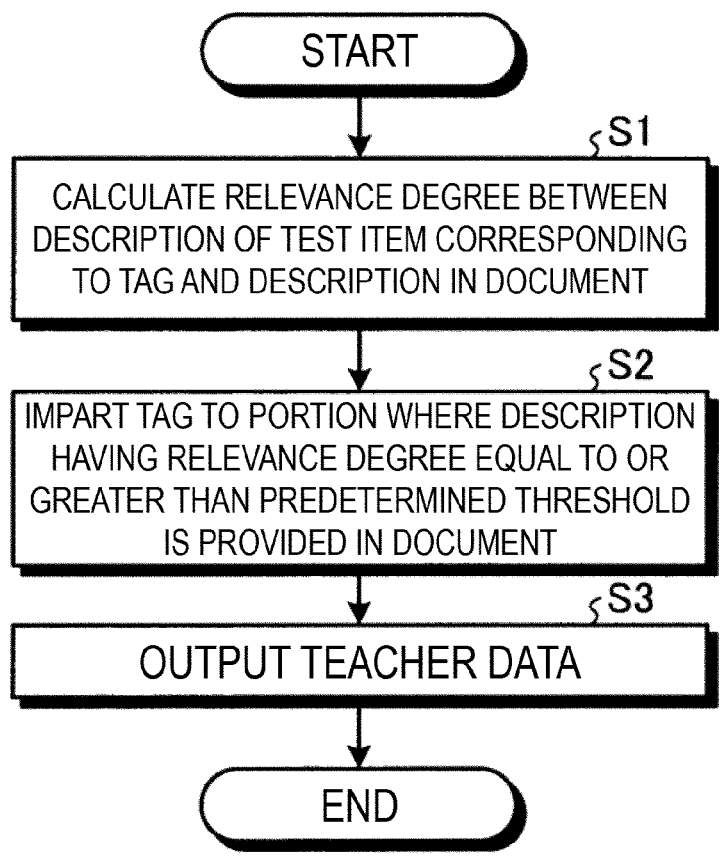
FIG. 5 is a flowchart illustrating a sequence of teacher data generation processing.

Next, teacher data generation processing by the teacher data generation apparatus 10 according to the present embodiment will be described with reference to FIG. 5. FIG. 5 is a flowchart illustrating a procedure of the teacher data generation processing. The flowchart of FIG. 5 starts, for example, at a timing at which a user inputs an operation of giving a start instruction.

First, the calculation unit 15a calculates a relevance degree between a description of a document and a description of a test item corresponding to a tag (step S1). For example, the calculation unit 15a calculates the relevance degree of each word using a probability of occurrence of the word in the document and a probability of occurrence of the word in the test item corresponding to the tag. Furthermore, the calculation unit 15a calculates an average value of relevance degrees of words constituting a sentence in the document as a relevance degree of each sentence.

Then, when the calculated relevance degree is equal to or greater than a predetermined threshold, the imparting unit 15b imparts a tag to a portion where the description is provided in the document (step S2).

Furthermore, the imparting unit 15b outputs generated teacher data (step S3). For example, the imparting unit 15b outputs the generated teacher data to an imparting device that automatically imparts a tag in a document, via the output unit 12 or the communication control unit 13. In this way, a series of the teacher data generation processing is terminated.

As described above, the teacher data generation apparatus 10 according to the present embodiment is the teacher data generation apparatus 10 for generating teacher data in which a tag corresponding to a description is imparted in a document, in which the calculation unit 15a calculates a relevance degree between a description in a document and a description in a document corresponding to a tag. When the calculated relevance degree is equal to or greater than a predetermined threshold, the imparting unit 15b imparts the tag to a portion where the description is provided in the document.

This allows the teacher data generation apparatus 10 to automatically generate teacher data in which the tag has been appropriately imparted in the document, whereby it becomes possible to easily supplement the teacher data for learning the tendency of imparting the tag in the document.

Furthermore, the calculation unit calculates the relevance degree of each word using a probability of occurrence of the word in the document and a probability of occurrence of the word in the document corresponding to the tag. This allows the teacher data generation apparatus 10 to impart the tag to a range in the document, for example, the range having the largest number of words with a high relevance degree.

The calculation unit also calculates an average value of relevance degrees of words constituting a sentence in the document as a relevance degree of the sentence. This allows the teacher data generation apparatus 10 to impart the tag to a range in the document per sentence, the range having a high relevance degree.

Figure 6:
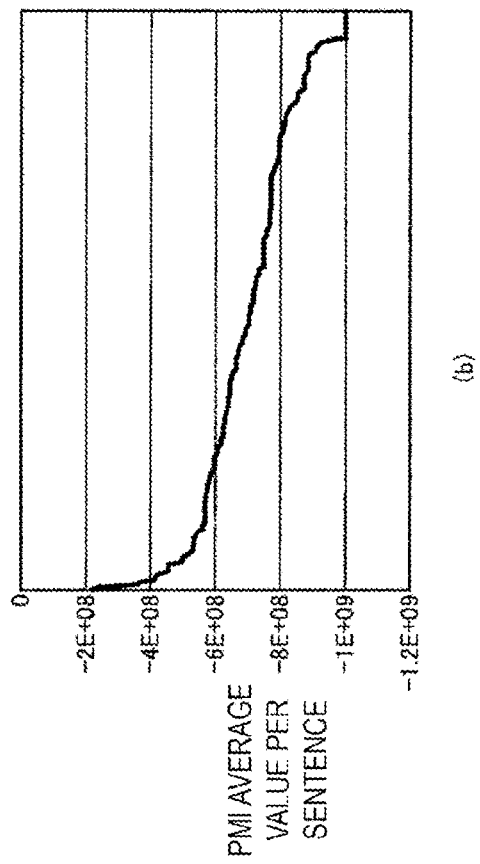
FIG. 6 is a diagram for explaining an effect of the teacher data generation processing.

FIG. 6 is a diagram for explaining an effect of the teacher data generation processing. FIG. 6 illustrates a case in which a relevance degree of each sentence to the description of the test item is calculated in a descending order of the relevance degree. In this case, as illustrated in FIG. 6(a), it has been found that the higher the PMI value of each sentence, that is, the average value of PMI values of words constituting each sentence, the more the sentence matches handling processing or a target development name of the test item. In other words, as illustrated in FIG. 6(b), it has been confirmed that the PMI value per sentence reflects the relevance degree of each sentence to the description of the test item.

Program

A program can be created in which the processing that is executed by the teacher data generation apparatus 10 according to the above-described embodiment is described in a computer-executable language. As an embodiment, the teacher data generation apparatus 10 can be implemented by installing a teacher data generation program executing the above-described teacher data generation processing in a desired computer as packaged software or online software. For example, an information processing apparatus can be made to function as the teacher data generation apparatus 10 by causing the information processing apparatus to execute the above-described teacher data generation program. The information processing apparatus mentioned here includes a desktop or laptop personal computer. Furthermore, as other examples, a mobile communication terminal such as a smartphone, a mobile phone, or a personal handyphone system (PHS), a slate terminal such as a personal digital assistant (PDA), and the like are included in the category of the information processing apparatus. In addition, the functions of the teacher data generation apparatus 10 may be mounted in a cloud server.

Figure 7:
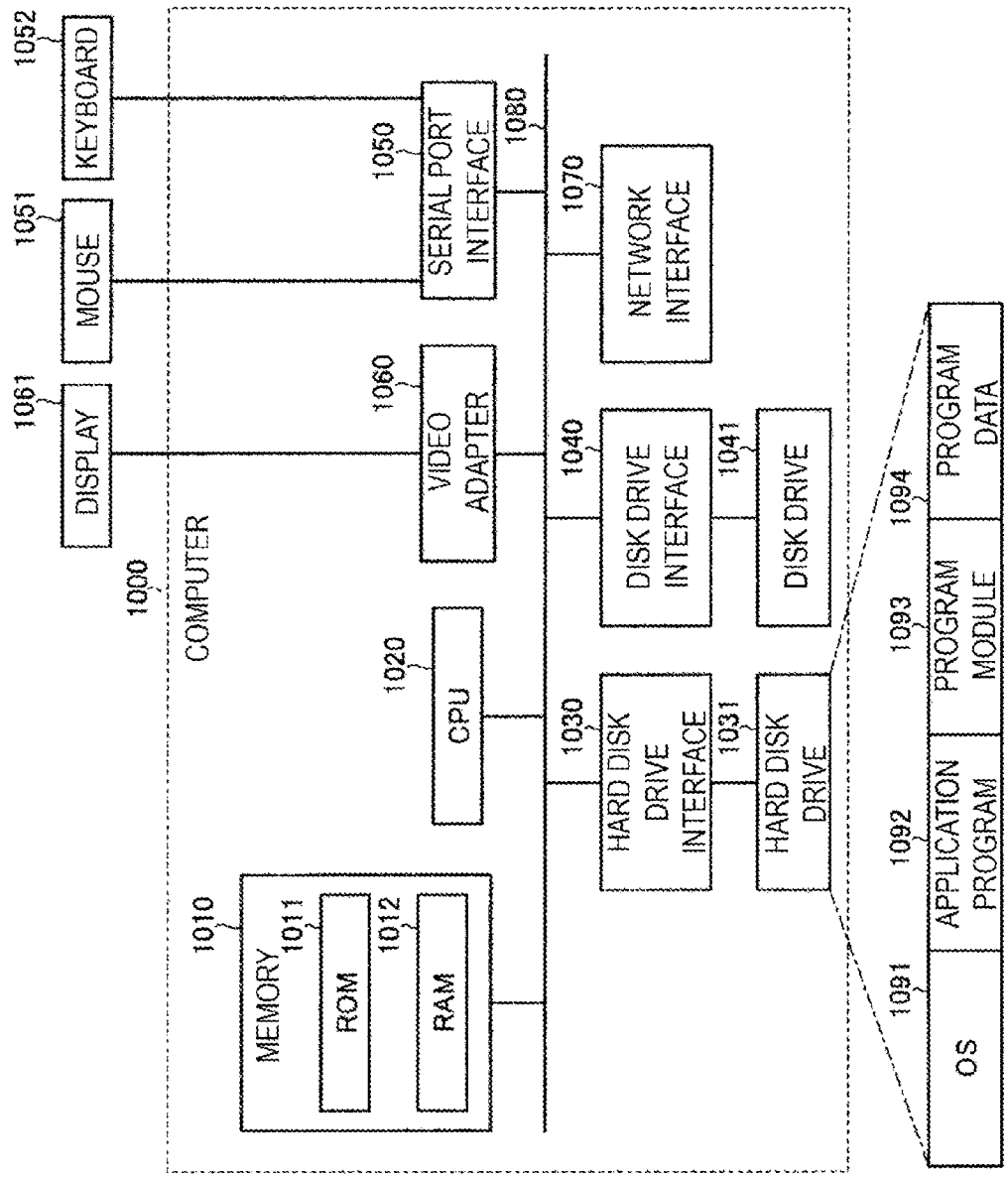
FIG. 7 is a diagram illustrating one example of a computer that executes a teacher data generation program.

FIG. 7 is a diagram illustrating an example of a computer that executes the teacher data generation program. A computer 1000 includes, for example, a memory 1010, a CPU 1020, a hard disk drive interface 1030, a disk drive interface 1040, a serial port interface 1050, a video adapter 1060, and a network interface 1070. These units are connected to each other through a bus 1080.

The memory 1010 includes a read only memory (ROM) 1011 and a RAM 1012. The ROM 1011 stores a boot program such as, for example, a basic input output system (BIOS). The hard disk drive interface 1030 is connected to a hard disk drive 1031. The disk drive interface 1040 is connected to a disk drive 1041. For example, a detachable storage medium such as a magnetic disk or an optical disc is inserted into the disk drive 1041. For example, a mouse 1051 and a keyboard 1052 are connected to the serial port interface 1050. For example, a display 1061 is connected to the video adapter 1060.

Here, the hard disk drive 1031 stores, for example, an OS 1091, an application program 1092, a program module 1093, and program data 1094. Each piece of information described in the aforementioned embodiment is stored in, for example, the hard disk drive 1031 and the memory 1010.

In addition, for example, the teacher data generation program is stored in the hard disk drive 1031 as the program module 1093 in which commands to be executed by the computer 1000 are described. Specifically, the program module 1093, in which each of the processing operations executed by the teacher data generation apparatus 10 described in the above-described embodiment is described, is stored in the hard disk drive 1031.

Furthermore, data to be used in information processing according to the teacher data generation program is stored, for example, in the hard disk drive 1031 as the program data 1094. Then, the CPU 1020 reads the program module 1093 and the program data 1094 stored in the hard disk drive 1031 into the RAM 1012 as needed and executes each of the aforementioned procedures.

Note that the program module 1093 and the program data 1094 related to the teacher data generation program are not limited to being stored in the hard disk drive 1031. For example, the program module 1093 and the program data 1094 may be stored on a detachable storage medium and read by the CPU 1020 through the disk drive 1041 or the like. Alternatively, the program module 1093 and the program data 1094 related to the teacher data generation program may be stored in another computer connected through a network such as a LAN or a wide area network (WAN) and read by the CPU 1020 through the network interface 1070.

Although the embodiment to which the invention made by the present inventors is applied has been described above, the present invention is not limited by the description and the drawings constituting a part of the disclosure of the present invention according to the present embodiment. In other words, all of other embodiments, examples, operation technologies, and the like made by those skilled in the art based on the present embodiment fall within the scope of the present invention.

REFERENCE SIGNS LIST

10 Teacher data generation apparatus
11 Input unit
12 Output unit
13 Communication control unit
14 Storage unit
15 Control unit
15*a* Calculation unit
15*b* Imparting unit

The invention claimed is:

1. A teacher data generation apparatus for generating teacher data in which a tag corresponding to a description is imparted in a document, the teacher data generation apparatus comprising:
   a calculation unit, including one or more processors, configured to calculate a relevance degree between a description in a first document and a description in a second document that has been tagged, wherein calculating the relevance degree comprises:
      calculating a pointwise mutual information metric for an individual word and a particular tag, wherein the pointwise mutual information metric characterizes a difference between (i) a first amount of information based on a probability of occurrence of the individual word in the first document and (ii) a second amount of information based on a probability of occurrence of the individual word in portions tagged with the particular tag in the second document;
   an imparting unit, including one or more processors, configured to impart the particular tag to a portion in the first document where the description is provided in the first document when the relevance degree calculated is equal to or greater than a predetermined threshold; and
   an output unit, including one or more processors, configured to generate training data comprising the first document with the imparted tag, and perform training of a machine-learning model configured to assigned a tag to a test document using the training data.

2. The teacher data generation apparatus according to claim 1, wherein the calculation unit is configured to calculate an average value of the pointwise mutual information metrics calculated for a plurality of words constituting a sentence in the first document as a relevance degree of the sentence.

3. A teacher data generation method performed by a teacher data generation apparatus for generating teacher data in which a tag corresponding to a description is imparted in a document, the teacher data generation method comprising:
    calculating a relevance degree between a description in a first document and a description in a second document that has been tagged, wherein calculating the relevance degree comprises:
        calculating a pointwise mutual information metric for an individual word and a particular tag, wherein the pointwise mutual information metric characterizes a difference between (i) a first amount of information based on a probability of occurrence of the individual word in the first document and (ii) a second amount of information based on a probability of occurrence of the individual word in portions tagged with the particular tag in the second document;
    imparting the particular tag to a portion in the first document where the description is provided in the first document when the relevance degree calculated is equal to or greater than a predetermined threshold; and
    generating training data comprising the first document with the imparted tag, and training a machine-learning model configured to assigned a tag to a test document using the training data.

4. A non-transitory computer readable medium storing a teacher data generation program for causing, in processing for generating teacher data in which a tag corresponding to a description is imparted in a document, a computer to execute:
    calculating a relevance degree between a description in a document and a description in a second document that has been tagged, wherein calculating the relevance degree comprises:
        calculating a pointwise mutual information metric for an individual word and a particular tag, wherein the pointwise mutual information metric characterizes a difference between (i) a first amount of information based on a probability of occurrence of the individual word in a first document and (ii) a second amount of information based on a probability of occurrence of the individual word in portions tagged with the particular tag in the second document;
    imparting the particular tag to a portion in the first document where the description is provided in the first document when the relevance degree calculated is equal to or greater than a predetermined threshold; and
    generating training data comprising the first document with the imparted tag, and training a machine-learning model configured to assigned a tag to a test document using the training data.

5. The teacher data generation method according to claim 3, further comprising:
    calculating an average value of a plurality of the relevance degrees of words constituting a sentence in the document as a relevance degree of the sentence, wherein a calculation unit is configured to calculate an average value of the pointwise mutual information metrics calculated for a plurality of words constituting a sentence in the first document as a relevance degree of the sentence.

6. The non-transitory computer readable medium according to claim 4, wherein the stored teacher data generation program further causes the computer to execute:
    calculating an average value of a plurality of the relevance degrees of words constituting a sentence in the document as a relevance degree of the sentence.

7. The teacher data generation apparatus according to claim 1, wherein the pointwise mutual information metric is computed as:

$$PMI = -\log P(y) - \{-\log P(y|x)\}$$

where $P(y)$ is the probability of occurrence of the individual word in the first document, and $P(y|x)$ is the probability of occurrence of the individual word in portions tagged with the particular tag in the second document.

8. The teacher data generation apparatus according to claim 1, wherein the machine-learning model is a conditional random fields (CRF) model.

* * * * *